United States Patent
Espinosa et al.

(10) Patent No.: US 12,447,684 B2
(45) Date of Patent: Oct. 21, 2025

(54) PRESSURE GAUGE PLUNGER FOR PLATFORMS FOR EXTRUSION-BASED 3D PRINTING OF SEMISOLID MASSES

(71) Applicant: Universidad de La Laguna, La Laguna (ES)

(72) Inventors: José Bruno Celso Fariña Espinosa, Santa Cruz de Tenerife (ES); Ana Maria Santoveña Estévez, Santa Cruz de Tenerife (ES); Eduardo Diaz Torres, Las Palmas de Gran Canaria (ES)

(73) Assignee: Universidad de La Laguna, La Laguna (ES)

( * ) Notice: Subject to any disclaimer, the term of this patent is extended or adjusted under 35 U.S.C. 154(b) by 258 days.

(21) Appl. No.: 18/267,016

(22) PCT Filed: Dec. 16, 2021

(86) PCT No.: PCT/ES2021/070900
§ 371 (c)(1),
(2) Date: Jun. 13, 2023

(87) PCT Pub. No.: WO2022/136710
PCT Pub. Date: Jun. 30, 2022

(65) Prior Publication Data
US 2025/0083390 A1  Mar. 13, 2025

(30) Foreign Application Priority Data
Dec. 21, 2020  (ES) .............................. ES202031276

(51) Int. Cl.
*B29C 64/386* (2017.01)
*B29C 64/343* (2017.01)
*B33Y 50/00* (2015.01)

(52) U.S. Cl.
CPC .......... *B29C 64/386* (2017.08); *B29C 64/343* (2017.08); *B33Y 50/00* (2014.12)

(58) Field of Classification Search
CPC ... B29C 64/386; B29C 64/343; B29C 64/393; F15B 15/02; F15B 15/204
(Continued)

(56) References Cited

U.S. PATENT DOCUMENTS 5,233,912 A * 8/1993 Mueller ............... B22D 17/203
403/348
5,396,831 A * 3/1995 Marvin ............... F15B 15/1447
403/324
2014/0102291 A1* 4/2014 Maurer ................. F15B 15/261
92/15

FOREIGN PATENT DOCUMENTS

EP  3626439 A1  3/2020
GB  522439 A  6/1940
(Continued)

OTHER PUBLICATIONS

PCT International Search Report and Written Opinion, dated Feb. 8, 2002, 14 pages.
(Continued)

Primary Examiner — Nathaniel J Kolb
(74) Attorney, Agent, or Firm — Boyle Fredrickson S.C.

(57) ABSTRACT

The pressure gauge plunger for 3D printing platforms is applicable in various 3D printing fields (bioprinting of tissues; and the food, pharmaceutical, and ceramic industries). Its usefulness is rooted in its ability to continuously control the pressure applied during the entire printing process, thanks to the plunger mechanism. It thereby allows improved quality and detection of errors in situ, allowing corrective actions to be applied during the process. The pressure value that the printing platform component exercises on the plunger (and, thus, on the mass to be extruded)

(Continued)

is obtained through use of a stress gauge, This continuous control allows profiling of the printed semi-solid mass, permitting the most appropriate printing parameters to be set in situ, further allowing the process to become completely automated.

4 Claims, 4 Drawing Sheets

(58) Field of Classification Search
USPC .............................................................. 92/29
See application file for complete search history.

(56) References Cited

FOREIGN PATENT DOCUMENTS

| GB | 693283 | 6/1953 | | |
|----|--------|--------|---|---|
| GB | 790502 | 2/1958 | | |
| WO | WO-0006233 A1 | * | 2/2000 | ............ A61M 5/488 |

OTHER PUBLICATIONS

Spanish Art Report, prepared in Madrid, dated Apr. 22, 2021, 8 pages.

* cited by examiner

Time (s)

|  | Uniformity of mass ||
|---|---|---|
|  | Mean ± RSD [relative standard deviation] | Conclusion |
| Without plunger gauge | 24.550 mg ± 10.10 % | 5 masses exceeded the limits DOES NOT MEET THE STANDARD |
| With plunger pressure gauge | 24.750 mg ± 2.89 % | No mass exceeded the limits MEETS THE STANDARD |

PRESSURE GAUGE PLUNGER FOR PLATFORMS FOR EXTRUSION-BASED 3D PRINTING OF SEMISOLID MASSES

TECHNICAL SECTOR

This invention falls within the 3D printing of semi-solid masses sector.

BACKGROUND OF THE INVENTION

Currently, 3D printing has taken on a very relevant role due to its versatility in various fields of small-scale industrial production, such as Pharmaceutical Technology and the production of pharmaceutical forms. This technology has been developed with the goal of reducing the long periods of time and enormous costs in the development and manufacture of drugs. (Jamróz et al., 2018) In the field of Pharmaceutical Technology, three techniques for 3D printing stand out, namely: Fused Deposition Modeling (FDM), direct extrusion, and gel extrusion (semi-solid extrusion, or SSE). In the latter, a semi-solid material (gel or paste) is passed through an orifice through compressed air pressure, a syringe plunger, or a worm screw. In the pharmaceutical industry, it is vital to ensure uniformity of mass (Monograph 2.9.5., Royal Spanish Pharmacopeia) and uniformity of content (Monograph 2.9.6., Royal Spanish Pharmacopeia) of all the pharmaceutical forms produced, thereby to comply with the requirements of the pharmacopeias of the different regulatory agencies (AEMPS, EMA, FDA, etc.). In 3D-printing techniques, the amount of active ingredient is determined by the extruded volume that, together with the control of the printing pressure, ensure the dispensing of the exact amount of material in the production of each of the pharmaceutical forms of each production batch, and, therefore, the dose of the active ingredient in them (Zidan et al., 2019). Within the technology of 3D printing with solid material, there are systems for making pharmaceutical compositions where the pressure within the printing device can be monitored (US2020338009).

Currently, in the state of the art of semi-solid mass extrusion, this control cannot be performed, which constitutes an important difficulty, since pressure is a critical parameter in the printing process (Zidan et al., 2019).

REFERENCES

Jamróz W, Szafraniec J, Kurek M, Jachowicz R. 3D printing in pharmaceutical and medical applications. Pharm Res. 2018; 35(9):1-22.

Zidan A, Alayoubi A, Coburn J, Asfari S, Ghammraoui B, Cruz C N, et al. Extrudability analysis of drug loaded pastes for 3D printing of modified release tablets. Int J Pharm [Internet]. 2019; 554(November 2018):292-301. Available from: https://doi.org/10.1016/j.ijpharm.2018.11.025.

Agencia Española de Medicamentos y Productos Sanitarios [Spanish Drug and Health Products Agency]. Monograph 2.9.5. UNIFORMIDAD DE MASA DE LAS PREPARACIONES UNIDOSIS [Uniformity of mass of single-dose preparations]. Royal Spanish Pharmacopeia. 2008

Agencia Española de Medicamentos y Productos Sanitarios. [Spanish Drug and Health Products Agency]. Monograph 2.9.6. UNIFORMIDAD DE CONTENIDO DE LAS PREPARACIONES UNIDOSIS [Uniformity of content of single-dose preparations]. Royal Spanish Pharmacopeia. 2008

EXPLANATION OF THE INVENTION

In the pharmaceutical industry and in the manufacture of dosage forms, unity of mass, which guarantees the homogeneity of the dosage of the main active ingredient in each of the printed dosage forms, is fundamental.

The semi-solid masses used in 3D printing by the SSE technique pass through a nozzle manifesting a particular behavior depending on its rheological properties, providing a linear flow only in a given pressure range. In the case of the printing of dosage forms, when the flow is not linear, dosage errors result.

To solve this problem, a plunger has been designed that is adaptable to syringe-type cylindrical dispensers of different volumes and capable of measuring the pressure applied during the entire printing process, in order to ensure that the correct quantity of semi-solid material is dispensed by micro-extrusion or semi-solid extrusion (SSE) in a 3D printing platform.

The plunger that is the subject of the invention is equipped with a strain gauge capable of continuously measuring the pressure that the printing platform engine applies on the same and, therefore, the pressure applied on the mass to extrude during the entire process, to obtain the desired three-dimensional form.

This invention, the instrumentalization of the plunger, offers a series of advantages outlined below:

It allows continuous rheological profiling of each of the masses used and, as a result, allows for the printing parameters to be adjusted before printing begins.

It ensures that the flow of the semi-solid mass through the syringe-type nozzle o the dispensing cylinder is consistent and, thus, that the extruded volume and therefore the dosage is correct.

Using the printing platform's personalized firmware, continuous control of the process can be achieved, and corrections can be made during the process.

It allows possible printing errors to be detects, such as the existence of air inside the mass, which may produce errors in the flow (sudden reduction of the printing pressure) or solidification inside the nozzles (sudden increase of the printing pressure). With this, those three-dimensional forms in which some of these errors have been recorded can be discarded, as well as assuring the design quality during the printing process of each dosage form in every batch produced.

For all the reasons explained above, the invention has a direct application in the field of 3D printing when semi-solid masses are used that require homogeneous dosage in each batch and between production batches, not only in the pharmaceutical industry but also in tissue bioprinting and the food, pharmaceutical (sic), and ceramic industries, among others.

BRIEF DESCRIPTION OF THE DRAWINGS

To complement the description offered herein, and for the purpose of helping to achieve a greater understanding of the characteristics of the invention, a series of figures are attached as an integral part of said description for illustrative purposes only; without implying any limits, they represent the following.

Extrusion starting point (13), feed-rate correction and pressure increase point (14), air detection and sudden pressure drop point (15), and extrusion cease point (16).

Figures 4, 5:
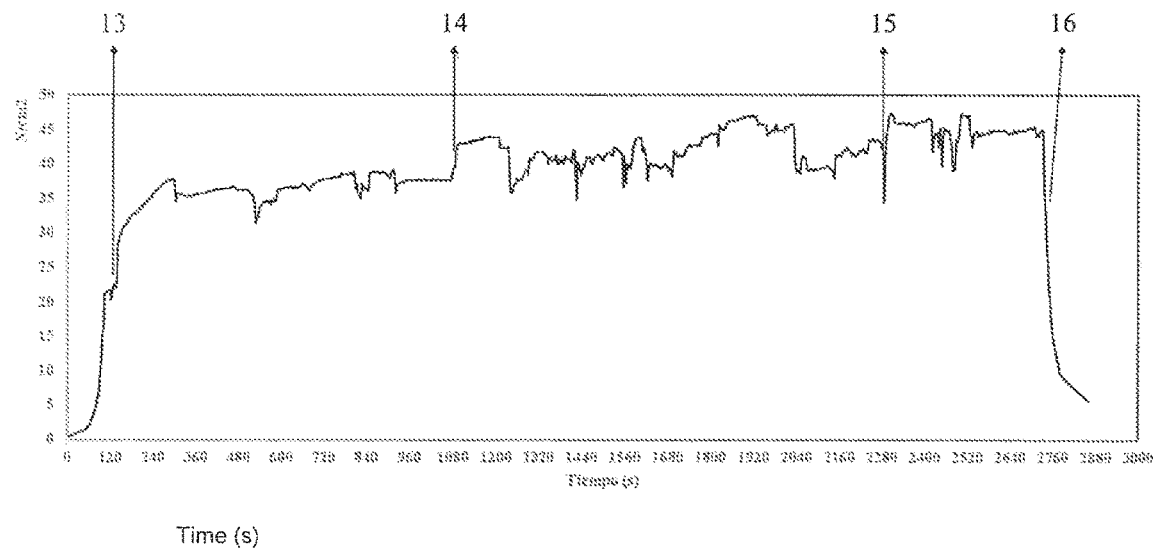
FIG. 4. Graphic representation of the dispersal of the data points obtained with the use of the invention during the 3D printing of more than 100 pharmaceutical forms. The detected pressure (N·cm$^{-2}$) (sic) is shown on the Y axis against time(s) on the X axis.

FIG. 5. Results of the comparative test of printing two batches of dosage forms according to the requirements of the Royal Spanish Pharmacopeia.

EMBODIMENT OF THE INVENTION

Figure 1:
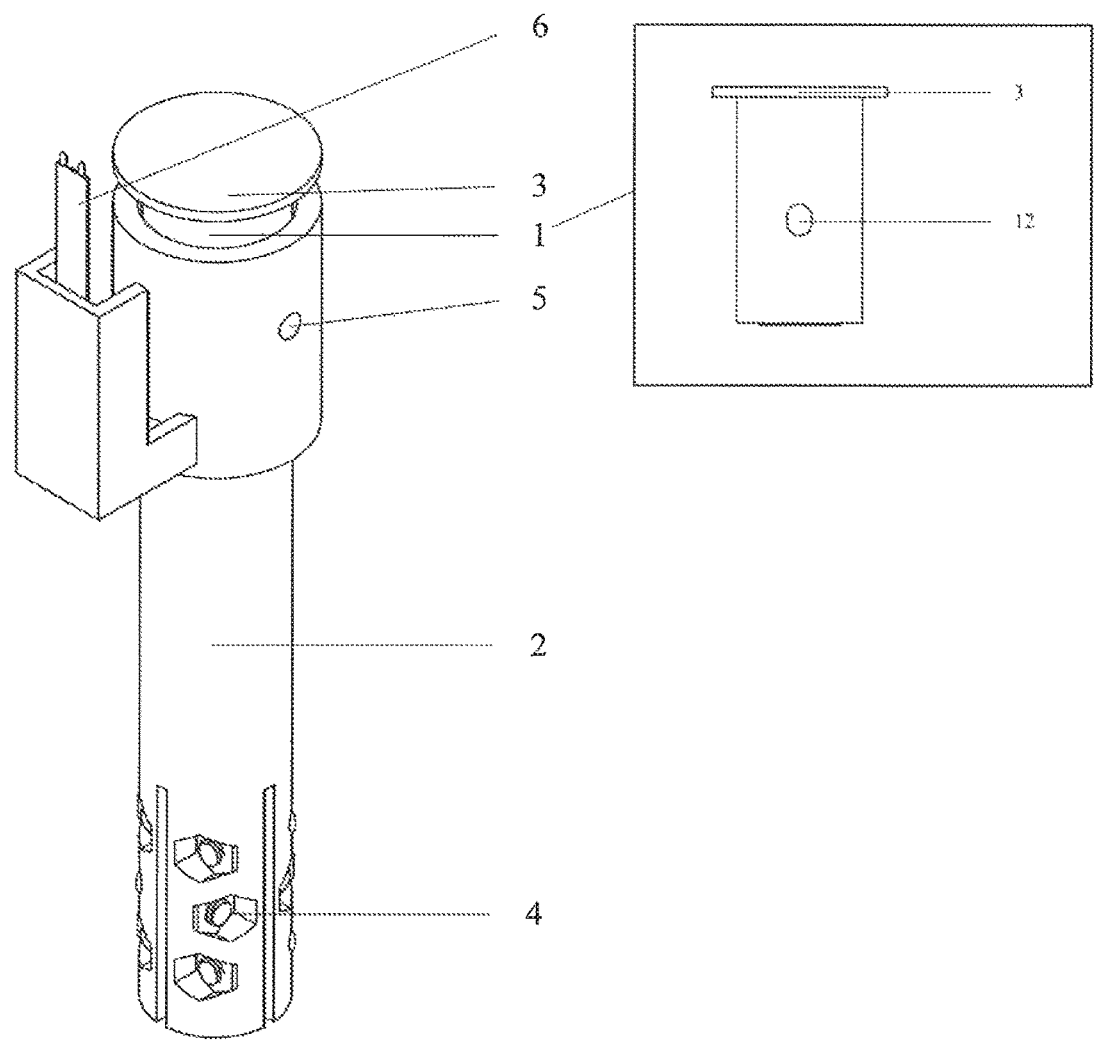
FIG. 1. Perspective view of the pressure gauge plunger for 3D printing platforms. The different parts of said instrumentalized plunger are shown: Movable cylinder (1), Central cylinder (2), Flap for fastening to the 3D platform (3), Screws to adapt the invention to any syringe plunger or dispensing cylinder (4), Circular orifice (5) for the fastening system between the movable cylinder (1) and the central cylinder (2), Pressure sensor connector (6), Oval orifice (12) for the fastening system between the movable cylinder (1) and the central cylinder (2)

The plunger that is the subject of the invention (FIG. 1) consists of four essential parts. A movable cylinder (1), a central cylinder (2), a pressure sensor (11) and a screw-based fastening zone (4).

Figure 2:
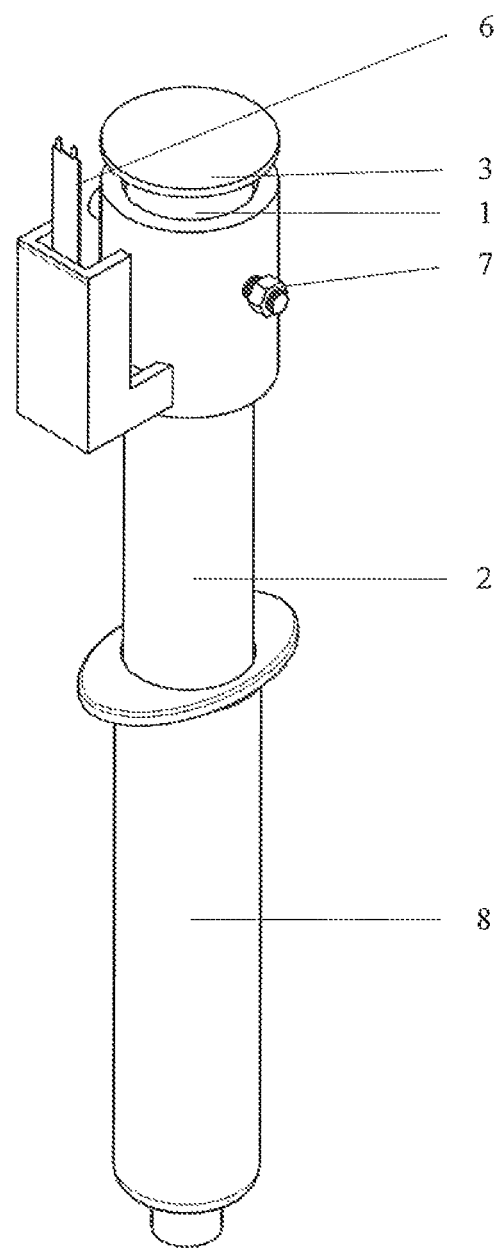
FIG. 2. Perspective view of the preferred embodiment of the invention created to be adjusted to a syringe used in a 3D printing platform. The elements represented in this figure are: Movable cylinder (1), Central cylinder (2), Flap for fastening to the 3D platform (3), Pressure sensor connector (6), Screw for the fastening system (7) between the movable cylinder (1) and the central cylinder (2), Syringe used in the 3D printing platform (8).
Figure 3:
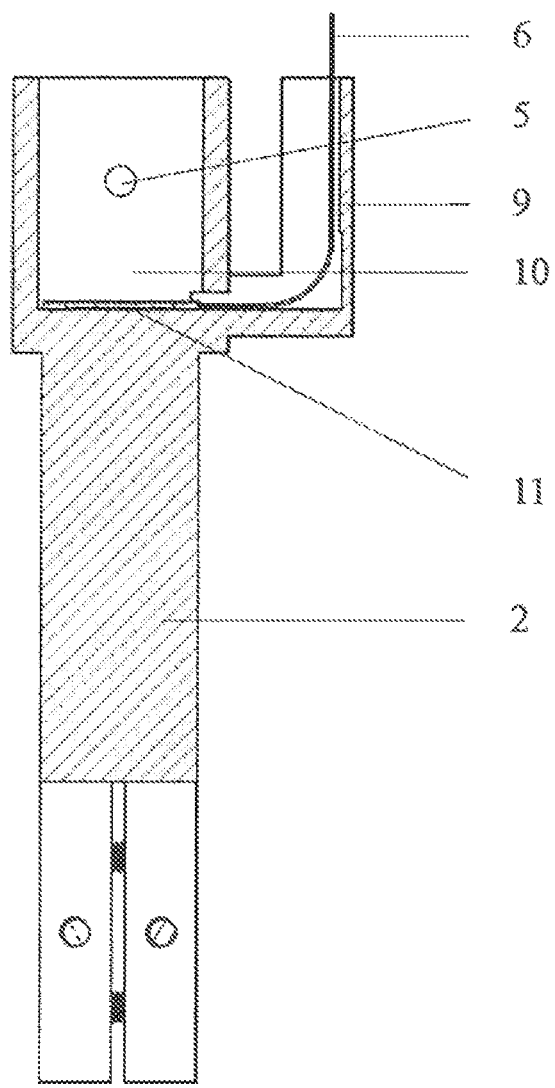
FIG. 3. Longitudinal section of the central cylinder. The elements represented in this figure are: Central cylinder (2), circular orifice (5) for the fastening system between the movable cylinder (1) and the central cylinder (2), Pressure-sensor connector (6), Connection cable with the extensometric gauge (9), Central cylinder's receptacle for the movable cylinder (10), Extensometric gauge (11).

In the preferred embodiment (FIG. 2), the central cylinder (2) and the movable cylinder (1) are linked up through a fastening system by using a screw (7). The movable cylinder has a tab (3) that allows the plunger to be connected to the 3D printing platform's rail, which puts pressure on it. At the end of the central cylinder there is a set of 6-10 screws (4) that allow the invention to adapt to any syringe plunger or dispensing cylinder, such as pre-charged cartridges with the main active principal ingredient or other substances.

In the preferred embodiment, the plunger has been adapted to a syringe (8) that contains the semi-solid mass (gel or paste) to extrude during the printing process. In this embodiment, the two main parts of the invention, (1) and (2), have been joined using a screw (7). The central cylinder's orifice (5) is circular, with the same diameter as the screw (7), while the movable cylinder's orifice (12) has an oval shape, leaving both parts attached but not fixed, allowing the lowering of the movable cylinder (1) inside the receptacle of the central cylinder (10) when the printing platform applies pressure on the cylinder. This connection allows motion between both parts in a range of 0.1-0.95 mm, which makes it possible to vary the pressure exerted on the mass to be extruded.

In the extreme lower part of the central cylinder (2), a disposable syringe plunger (7) is tightly connected with screws (4); the plunger comes into contact with the mass to be extruded that is inside the syringe. While the movable cylinder is descending inside the central cylinder's receptacle (10), pressure is applied on its base, which is detected by a stress gauge (11) attached to said base.

This sensor is based on the piezoresistive effect, a property that certain materials have of changing their normal resistance value when they are subjected to a certain pressure; thus, greater pressure means less electrical resistance. To establish a relationship between the recorded voltage and the applied pressure, the calibration is corrected in the pressure range in which a linear response is obtained, using a standard set of weights and repeated measurements.

Through a male two-pin clincher-type connector (6), the sensor is connected to an electronic resistance circuit that, together with a plate with an Arduino® type microcontroller, allows continuous recording of the data, which can be stored for later interpretation thanks to web software created for such purpose. This software can apply adjustments by overcoming certain pre-established pressure limits, sending commands to vary the feed rate through the API (Application Programming Interface) of the server integrated into the printing platform. A constant pressure and linear printing flow are obtained with this.

With this invention, it is possible to make orodispersable pharmaceutical forms from a very reduced size (4.0 mm×1.5 mm) and with a weight of only 25 mg, that meet the requirements proposed by the Royal Spanish Pharmacopeia, namely uniformity of mass of single-dose preparations (Monograph 2.9.5., Royal Spanish Pharmacopeia) and uniformity of content of single-dose preparations (Monograph 2.9.6.,Royal Spanish Pharmacopeia).

The uniformity of mass test comparing the standard printing process (without the pressure gauge plunger) to the improved printing process using the pressure gauge plunger, demonstrated that in the second case, the necessary requirements were met; this did not occur when there was no control over the pressure in the extrusion process (FIG. 5).

In another embodiment of the invention, the adjustment between the movable cylinder (1) and the central part (2) is made via a threaded set tab hat allows both parts to stay together, but not attached.

In another embodiment of the invention, the printer's firmware can be modified directly, which would let it make direct feedback on the pressure, making the latter self-adjust, modifying the feed rate during the printing process.

The invention claimed is:

1. A pressure-gauge plunger for 3D printers for extrusion of semi-solid material characterized by a movable cylinder, a central cylinder, a fastening system between the movable cylinder and the central cylinder wherein a fastening screw extends through the central cylinder and into an elongated hole in the movable cylinder such that the movable cylinder can slide with respect to the central cylinder; a pressure sensor, and a bottom end fastened to a receptacle that contains the material to extrude.

2. The plunger according to claim 1, wherein the fastening system allows a maximum displacement range of 1 cm between the cylinders.

3. The plunger according to claim 2, wherein the pressure sensor is a strain gauge located between the movable cylinder and the central cylinder, which allows the continuous recording of extrusion pressure data.

4. The plunger according to claim 3, attachable through the bottom end both for conventional syringe plungers and for preloaded printing cartridges through a fastening system based on a set of 6-10 screws and a set of grooves into which the syringe or preloaded cartridge is inserted.

\* \* \* \* \*